United States Patent
Zhao et al.

(10) Patent No.: US 12,237,901 B2
(45) Date of Patent: Feb. 25, 2025

(54) BEAM REPORTING FROM A COMMUNICATION DEVICE

(71) Applicant: Sony Group Corporation, Tokyo (JP)

(72) Inventors: Kun Zhao, Malmö (SE); Olof Zander, Södra Sandby (SE); Fredrik Rusek, Eslöv (SE); Erik Bengtsson, Eslöv (SE); Zuleita Ho, Lund (SE)

(73) Assignee: Sony Group Corporation, Tokyo (JP)

( * ) Notice: Subject to any disclaimer, the term of this patent is extended or adjusted under 35 U.S.C. 154(b) by 563 days.

(21) Appl. No.: 17/272,297

(22) PCT Filed: Jul. 31, 2019

(86) PCT No.: PCT/SE2019/050719
§ 371 (c)(1),
(2) Date: Feb. 27, 2021

(87) PCT Pub. No.: WO2020/067946
PCT Pub. Date: Apr. 2, 2020

(65) Prior Publication Data
US 2021/0184751 A1    Jun. 17, 2021

(30) Foreign Application Priority Data

Sep. 24, 2018 (SE) .................................. 1851134-5

(51) Int. Cl.
H04B 17/309 (2015.01)
H04B 7/06 (2006.01)
H04W 24/10 (2009.01)

(52) U.S. Cl.
CPC .......... H04B 7/0695 (2013.01); H04B 17/309 (2015.01); H04W 24/10 (2013.01)

(58) Field of Classification Search
CPC .............. H04B 7/0695; H04B 7/06952; H04B 17/309; H04B 17/318; H04B 17/327;
(Continued)

(56) References Cited

U.S. PATENT DOCUMENTS

| | | | |
|---|---|---|---|
| 2013/0235742 A1* | 9/2013 | Josiam | H04W 24/10 370/252 |
| 2017/0207843 A1 | 7/2017 | Jung et al. | |
| 2018/0048375 A1 | 2/2018 | Guo et al. | |
| 2018/0192371 A1 | 7/2018 | Jung et al. | |
| 2018/0212653 A1 | 7/2018 | Miao | |
| 2018/0220403 A1 | 8/2018 | John Wilson | |
| 2020/0014430 A1* | 1/2020 | Zhang | H04L 5/0057 |

FOREIGN PATENT DOCUMENTS

| | | |
|---|---|---|
| CN | 105009473 A | 10/2015 |
| CN | 105556869 A | 5/2016 |

(Continued)

OTHER PUBLICATIONS

International Search Report and Written Opinion from corresponding International Application No. PCT/SE2019/050719, mailed on Oct. 11, 2019, 12 pages.

(Continued)

*Primary Examiner* — Un C Cho
*Assistant Examiner* — Lalita W Pace
(74) *Attorney, Agent, or Firm* — Tucker Ellis LLP

(57) ABSTRACT

A communication device (30) and a method for a communication device (30), for providing a beam report (401) to an access node (20) of a wireless network, wherein the communication device is capable of communicating via at least two different device beams (34, 36). The method comprises receiving (912), from the access node (20), at least a first access node beam (50) having a first access node identity, and a second access node beam (51) having a second access node beam identity; determining (914) link quality metrics for each received access node beam; transmitting (916) the beam report (401), comprising said access node beam identities and said link quality metrics, to the access node; wherein the beam report includes information indicating whether said link quality metrics for the first access node beam (50) and a second access node beam (51) are associated with different device beams.

18 Claims, 6 Drawing Sheets

(58) Field of Classification Search
CPC .. H04B 17/328; H04B 17/336; H04B 17/345; H04B 17/346; H04B 7/0617; H04B 7/0619; H04B 7/02; H04B 7/04; H04B 7/06; H04B 7/08; H04W 24/10; Y02D 30/70

See application file for complete search history.

(56) References Cited

FOREIGN PATENT DOCUMENTS

| | | |
|---|---|---|
| EP | 3280068 A1 | 2/2018 |
| GB | 2458324 A | 9/2009 |
| JP | 2016540422 A | 12/2016 |
| KR | 20130030404 A | 3/2013 |
| WO | WO-2014042562 A1 | 3/2014 |
| WO | WO-2017111642 A1 | 6/2017 |
| WO | 2018085601 A1 | 5/2018 |

OTHER PUBLICATIONS

Swedish Search Report from corresponding Swedish Application No. 1851134-5, mailed on Mar. 6, 2019, 3 pages.

Samsung, "Discussion on Network triggered beam reporting", 3GPP TSG RAN WG1 Meeting 87, R1-1612512; dated Nov. 14-18, 2016, 4 pages.

Catt, "Discussion on DL beam management", 3GPP TSG RAN WG1 Meeting 89, R1-1707475; dated May 15-19, 2017, 10 pages.

\* cited by examiner

| BS beam | Gain |
|---|---|
| 2 | 10 |
| 6 | 2 |
| 7 | 9 |

Fig. 3    State of the art 41  42  43

| BS beam | UE beam | Gain |
|---|---|---|
| 2 | 1 | 10 |
| 6 | 1 | 2 |
| 7 | 2 | 9 |

| BS beam | Gain |
|---|---|
| UE beam 1 | |
| 2 | 10 |
| 6 | 2 |
| UE beam 2 | |
| 7 | 9 |

— 401

41  43

| BS beam | Gain |
|---|---|
| 2 | 10 |
| 6 | 2 |
| 7 | 9 |

| BS beam | Gain |
|---|---|
| 2 | 10 |
| 6 (*1) | 2 |
| 7 | 9 |

| | 41 | 42 | 43 | |
|---|---|---|---|---|
| | BS beam | UE beam | Gain | |
| | 2 | 1 | 10 | |
| | 7 | 2 | 9 | ← 401 |

Fig. 7A

| | 41 | 42 | 43 | |
|---|---|---|---|---|
| | BS beam | UE beam | Gain | |
| | 2 | 1 | 10 | |
| | 2 | 2 | 2 | ← 701 |
| | 7 | 1 | 3 | |
| | 7 | 2 | 9 | |

Fig. 7B

| | 41 | 43 | |
|---|---|---|---|
| | BS beam | Gain | |
| | 2 | 10 | |
| | 2 | 2 | |
| | 7 | 3 | ← 701 |
| | 7 | 9 | |

Fig. 7C

| | 41 | 42 | 83 | |
|---|---|---|---|---|
| | BS beam | UE beam | Channel value | |
| | 2 | 1 | 2-1.8i | |
| | 2 | 2 | 0.4+0.34i | ← 801 |
| | 7 | 1 | -0.2 -0.4i | |
| | 7 | 2 | 1.5+1.6i | |

Fig. 8

BEAM REPORTING FROM A COMMUNICATION DEVICE

TECHNICAL FIELD

The present invention relates to methods for operating communication devices and access nodes in a wireless communication system, in particular to methods associated with multiple input and multiple output (MIMO) technologies, where the communication configured with multiple receive and possibly transmit chains and antennae to at least receive radio signals in multiple beams. The present invention relates furthermore to communication devices, access nodes and a communication system supporting the methods.

BACKGROUND

Increasing use of mobile voice and data communications may require a more efficient utilization of the available radio frequency resources. For increasing data transmission performance and reliability, the so-called multiple input and multiple output (MIMO) technology may be used in wireless radio telecommunication systems for transmitting information between the devices, for example between a base station and a user equipment. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

The so-called full dimensional MIMO (FDMIMO) refers to a technology that arranges the signals transmitted to antennas in the form of beams that are able to power multiple receivers in three dimensions, where each beam may be associated with one antenna port. For example, a base station may comprise a large number of active antenna elements in a two-dimensional grid and the use of the FDMIMO technology enables a support of many spatially separated users on the same time/frequency resource blocks simultaneously. This may reduce interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic may need information about radio channel properties between the user equipment and the antennas of the base station. Vice versa, in order to adapt the transmit signal at each individual antenna of the user equipment, a user equipment logic may need information about the radio channel properties between the base station and the antennas of the user equipment. For this purpose, a so-called channel sounding may be performed to determine the radio channel properties between the user equipment and the base station, by determining link quality metrics. The channel sounding may comprise transmitting predefined pilot signals which may allow the base station and the user equipment to set their configuration antenna parameters for transmitting signals so as to focus radio energy or for receiving radio signals from a certain direction.

In evolving standards, for example in 3GPP RAN1 Release 15, is defined that the base station broadcasts beam shaped synchronization signals (so-called SS-bursts). Different SS-bursts targeting different directions or polarizations are distributed both in time and frequency domain such that each beam is occurring at each sub-band over time. The user equipment may listen for the SS-bursts and may use the received signal to calibrate frequency and timing. The user equipment may scan or adjust its receive beam, or device beam, in order to find the direction that is associated with the strongest SS-burst or CSI-RS.

Uplink (UL) MIMO has been discussed in RAN4 for mm-wave (FR2). The definition so far has only covered RF parameters and not explicitly specified operation involving different UL beam directions. However, there is a problem associated with UL MIMO that cannot be overlooked. With MIMO, it is, by definition, required that both parts are equipped with multiple receive (rx) and preferably transmit (tx) chains. Translated to terms used when referring to NR, this means that both parts must have at least two beams. In NR, good beams are selected from a beam sweep/scan where the base station sweeps its transmit beams. In order for the base station to know the channel quality across its beams, the user equipment is configured to report a candidate list of detected beams to the base station. A beam report from a user equipment may include a list of detected beams and determined link quality metrics for those beams. Such a beam report may be visualized as in FIG. 3, which lists a number of beam candidates detected by the user equipment, and the associated link quality metric determined by the user equipment, e.g. represented by gain. Based on this beam report, the base station can now infer that its beams 2 and 7 can be heard strongly at the user equipment. This meets the MIMO requirement that there are at least two beams, so that MIMO can be activated. However, with this kind of list, there is no way the base station can know that the user equipment can hear base station beam 2 and 7 in different device beams, i.e. beams defined by the antenna and receive chains of the user equipment. Hence, the base station can, in fact, not activate MIMO.

In view of the above, there is a need in the art for methods and devices which address at least some of the above shortcomings of conventional MIMO systems. In particular, there is a need in the art for providing suitable basis for deciding on MIMO.

SUMMARY

According to the present invention, this object is achieved by the features of the independent claims. The dependent claims define embodiments of the invention.

According to a first aspect, a method is provided for use in a communication device for providing a beam report to an access node of a wireless network, wherein the communication device is capable of communicating via at least two different device beams, the method comprising receiving, from the access node, at least a first access node beam having a first access node identity, and a second access node beam having a second access node beam identity;

determining link quality metrics for each received access node beam;

transmitting the beam report, comprising said access node beam identities and said link quality metrics, to the access node;

wherein the beam report includes information indicating whether or not said link quality metrics for the first access node beam and a second access node beam are associated with different device beams.

In one embodiment, said information identifies link quality metric for a pair of one device beam and one access node beam.

In one embodiment, said information is provided by a device beam identity linked to the access node identity for each of said first and second access node beam.

In one embodiment, said information identifies the device beam associated with each received access node beam by means of an order of providing the access node identities in the beam report.

In one embodiment, said information includes data linking said first and second access node identities in the beam report, responsive to the link quality metric for the first and second access node beams being associated with a common device beam.

In one embodiment, the method comprises detecting a trigger event for an extended beam report;

providing said information in the beam report responsive to said trigger event for an extended beam report.

In one embodiment, the method comprises determining interference data, including link quality metrics for the first and second access node beam, each associated with at least two different device beams;

transmitting an interference report to the access node, including said interference data.

In one embodiment, the method comprises detecting a trigger event for an interference report;

wherein determining interference data and/or transmitting the interference report is carried out responsive to said trigger event for an interference report.

In one embodiment, the beam report includes link quality metrics for both the first access node beam and a second access node beam only if they are associated with different device beams, responsive to second access node beam.

According to a second aspect, a method is provided for use in an access node of a wireless network, for transmission of radio signals in a plurality of access node beams of a beam sweep, comprising receiving a beam report from a communication device, including link quality metrics for at least a first access node beam and a second access node beam out of the plurality of access node beams;

detecting information in the beam report, indicating whether or not said link quality metrics for the first access node beam and a second access node beam are associated with different device beams in the communication device;

selecting at least one beam for communication with the communication device based on at least said beam report.

In one embodiment, the method comprises transmitting a control signal to the communication device, indicating a desired beam report definition with regard to association of said link quality metrics to said device beams.

In one embodiment, said control signal includes a trigger for an extended beam report, instructing the communication device to provide said information in the beam report.

In one embodiment, said control signal includes a trigger for interference data, instructing the communication device to include link quality metrics for the first and second access node beam, each associated with at least two different device beams.

In one embodiment, said quality link metric is a channel value determined in the communication device.

According to a third aspect, a communication device is provided, configured to communicate with an access node of a wireless network via a plurality of different device beams, comprising an antenna arrangement configured for receiving radio signals transmitted in a plurality of beams from an access node, and for transmitting radio signals; and a logic coupled to the antenna arrangement and configured to:

receive, from the access node, at least a first access node beam having a first access node identity, and a second access node beam having a second access node beam identity;

determine link quality metrics for each received access node beam;

transmit the beam report, comprising said access node beam identities and said link quality metrics, to the access node;

wherein the beam report includes information indicating whether said link quality metrics for the first access node beam and a second access node beam are associated with different device beams.

In one embodiment, the communication device is configured to operate in accordance with any of the mentioned method embodiments.

According to fourth aspect, an access node of a wireless network is provided, comprising an antenna arrangement for transmission of radio signals in a plurality of access node beams of a beam sweep, and for receiving radio signals from a communication device; and a logic coupled to the antenna arrangement and configured to:

receive a beam report from a communication device, including link quality metrics for at least a first access node beam and a second access node beam;

detect information in the beam report, indicating whether said link quality metrics for the first access node beam and a second access node beam are associated with different device beams in the communication device; and select at least one beam for communication with the communication device based on at least said beam report.

In one embodiment, the access node is configured to operate in accordance with any of the aforementioned method embodiments.

Although specific features are described in the above summary and in the following detailed description described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

FIG. 3 schematically illustrates a state of the art beam report including a candidate list.

FIGS. 4-8 schematically illustrate different beam reports of various embodiments of device beam indication data formatted to identify at least one pair of device beams configured to a common phase but different polarizations.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Figure 1:
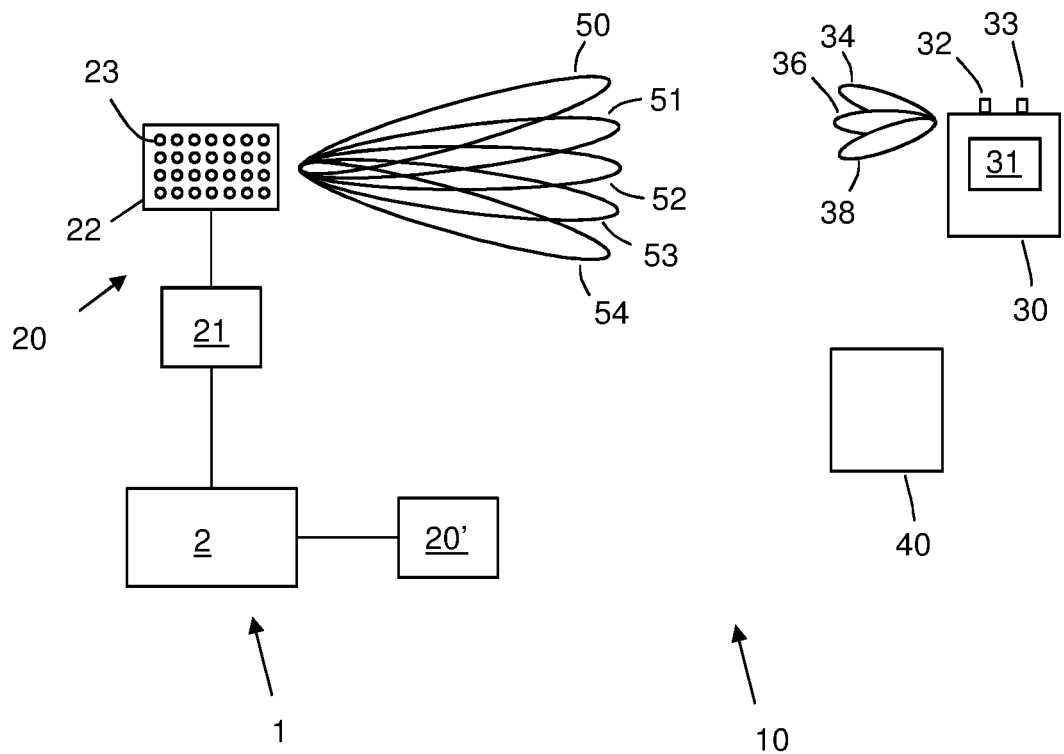
FIG. 1 schematically illustrates a wireless communication system according to an embodiment.

With reference to FIG. 1, solutions are described in the context of wireless communication in a wireless communication system 10, typically operating by means of radio communication or other electromagnetic communication. As such, the wireless communication system 10 includes at least one wireless communication device 30, 40, configured to communicate with a wireless network 1 via an access node 20. The network 1 may include a core network 2 and a plurality of access nodes 20, 20' connected to the core network 2. In various embodiments the wireless system 10 may include a cellular wireless network, where a plurality of access nodes 20, 20' may cover a contiguous area and be configured to hand over communication or connection from one access node to another, as a wireless communication device 30 moves from one cell to another. In such systems, access nodes are commonly referred to as base stations. In 3GPP systems for LTE the term eNB is used, and for 5G New Radio (NR) the term gNB has been employed. Alternatively, the access nodes 20 may form discontinuous or uncorrelated coverage, and e.g. act as Wi-Fi access points or hotspots under one or more 3GPP 802.11 specification.

Herein, the term access node will generally be used to designate an entity of a wireless network, used for establishing and controlling an air interface for communication with wireless communication devices. The access node may furthermore include more than one operational entity. For the example of 3GPP NR, the access node may e.g. include both a gNB and one or more TRPs. Furthermore, communication device will be the term used for a wireless device configured to communication with an access node, and possibly directly with or via other communication devices. In specifications under 3GPP, such communication devices are generally referred to as user equipment, UE.

FIG. 1 shows a wireless communication system 10 according to an embodiment. The wireless communication system 10 includes at least one access node 20 and a plurality of communication devices. In FIG. 1, two communication devices 30 and 40 are shown. The access node 20 may support a so-called multiple input and multiple output (MIMO) technology and therefore the access node 20 may have a large number of antennas, for example several tens or in excess of one hundred antennas.

The access node 20 comprises an antenna arrangement 22 comprising a plurality of antennas which are indicated by circles in FIG. 1. One exemplary antenna of the plurality of antennas is referenced by reference sign 23. The antennas 23 may be arranged in a two-dimensional or three-dimensional antenna array on a carrier. The access node 20 may comprise furthermore associated (not shown) transceivers for the antennas 23. The access node 20 comprises furthermore an access node logic 21. The access node logic 21 is coupled to the antenna arrangement 22 and comprises for example a controller, a computer or a microprocessor. The logic 21 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 21 over a data bus. The data storage device is considered a non-transitory computer readable medium. One or more processors of the logic 21 may execute instructions stored in the data storage device or a separate memory in order to carry out operation of the access node 20, as outlined herein. The access node 20 may comprise more components, for example a power supply, but these components are not shown in FIG. 1 for clarity reasons. Although in FIG. 1 only one antenna arrangement 22 is shown, the access node 20 may comprise more than one antenna arrangement, for example two, three, four or even more, for example several tens of antenna arrangements, which may cooperate with each other and which may be arranged near to each other or spaced apart.

The antenna arrangement 22 may be configured to transmit radio-frequency signals, or radio signals for short, into specific directions, herein referred to as beams. Five of these beams are shown in FIG. 1 and indicated by reference signs 50-54. The configuration of the beams may be static or dynamic. The transmission of radio frequency signals into a specific direction may be achieved by beamforming technologies as it is known in MIMO technologies. In connected mode, a communication device 30 may be able to communicate with the access node 20 through one beam, or possibly more than one beam. However, the access node 20 may continuously announce its beams by beam sweeping, wherein the beams are individually announced in different resources, such as one at a time or separated in frequency, or even in the same resources but spatially separated, where after communication devices are provided with the opportunity to report back to the access node 20, indicating one or more detected beams. This may be referred to as beam sweeping.

The antenna arrangement 22 may be equipped with dual polarized antennas and may therefore have the capability to transmit and/or receive signals with 30 any polarization, for example a first polarization and second polarization, wherein the first and second polarizations are orthogonal to each other. Furthermore, in particular spatially distributed antenna arrangements may be capable of transmitting radio-frequency signals having also a third polarization which is orthogonal to the first polarization and orthogonal to the second polarization.

In the communication system 10, as shown in FIG. 1, a plurality of communication devices like mobile phones, mobile and stationary computers, tablet computers, smart wearable devices or smart mobile devices may be arranged. Two exemplary communication devices 30 and 40 are shown in FIG. 1. Each of the communication devices 30 and 40 may be configured to communicate with the access node 20.

In the following, the communication device 30 will be described in more detail. However, the communication device 40 may comprise similar features as the communication device 30 and may therefore act similarly. The communication device 30 comprises one or more antennas. In the exemplary embodiment shown in FIG. 1, the communication device 30 comprises two antennas 32 and 33. For example, the antennas 32, 33 may each comprise an antenna panel or an antenna array, or the antennas 32, 33 may be formed by an antenna array comprising a plurality of antennas. Furthermore, the communication device 30 comprises a logic 31. The logic 31 may comprise for example a controller or microprocessor. The logic 31 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 31 over a data bus. The data storage device is considered a non-transitory computer readable medium. One or more processors of the logic 31 may execute instructions stored in the data storage device or a separate memory in order to carry out operation of the communication device 30, as outlined herein. The communication device 30 may comprise more components, for example a graphical user interphase and a battery, but these components are not shown in FIG. 1 for clarity reasons.

The antennas 32, 33 of the communication device 30 may be arranged spaced apart from each other, for example, the two antennas 32 and 33 may be arranged at a top side of the communication device near the edges. As an alternative, one or more antennas may be arranged at the top side and some other antennas may be arranged at a bottom side of the communication device 30. The two, or more, antennas 32, 33 form an antenna arrangement, whereby the communication device 30 is configured to receive radio signals in multiple device beams 34, 36, 38 as will be further discussed with reference to FIG. 2. The communication device 30 may be configured to operate multiple receive beams and multiple transmit beams, simply referred to herein as device beams 34, 36, 38, by including different precoders that enable spatial multiplexing. For example, one device beam 34 may be configured for reception and/or transmission of radio signals with a first phase shift and a second device beam 36 may be configured for reception and/or transmission of radio signals with a second phase shift, where said phase shift relates to a relative phase shift between the antenna elements 32, 33. In various embodiments, this may mean that a first beam 34 is configured to receive and/or transmit radio signals in first direction, whereas a second beam 36 is configured to receive and/or transmit radio signals in a second direction. The communication device 30 is thereby configured for communication with spatial directivity. Such directions may be set by the antenna port or structure, or by phase adaptation by means of one or more phase shifters connected to the antenna arrangement 32, 33. Since a communication device 30 may be mobile, and thus rotatable with regard to the access node 20, device beam adaptation and/or selection may be repeatedly required.

Figure 2:
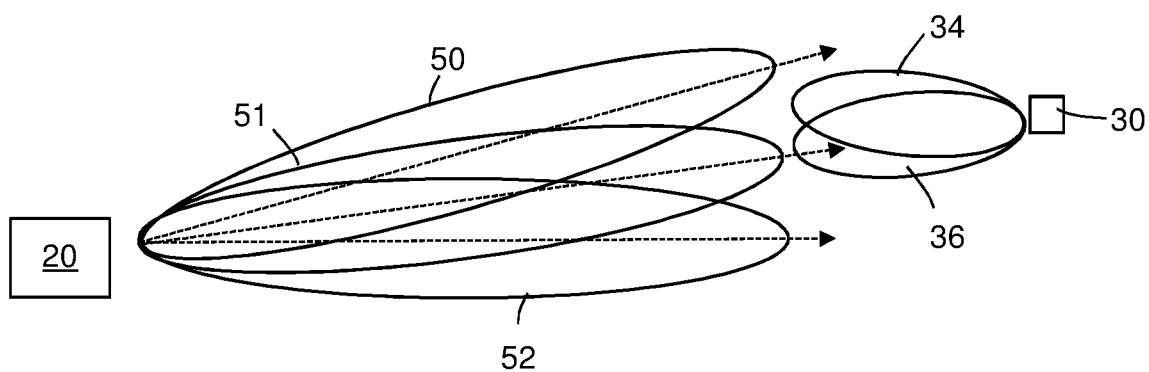
FIG. 2 schematically illustrates reception of access node beams in two different device beams of a communication device configured to receive data in multiple beams.

FIG. 2 illustrates the communication device 30 of FIG. 1, in a scenario where it is located within a cell or coverage area of an access node 20 configured for transmission of radio signals in a plurality of access node beams 50-55 of a beam sweep. The communication device is configured to be capable of communicating via at least two different device beams 34, 36, and is able to receive and detect access node beams in said device beams 34, 36. The access node 20 and the communication device 30 may thus be able to communicate by MIMO. In addition to what was laid out with reference to FIG. 1, the communication device 30 may be configured to distinguish polarization in the device beams 34, 36. This may e.g. be arranged by means of polarization ports connected between the phase shifters and the antennas 32, 33. The communication device 30 may be configured such that one device beam 34 may be configured to receive and/or transmit radio signals in a first polarization, whereas another beam 35 may be may be configured to receive and/or transmit radio signals in a second polarization, which is different from the first polarization. More specifically, the first and second polarizations may be orthogonal.

Normally, the network 1, and specifically the access node 20, is in control of taking decisions on which beams or channels to employ for communication with the communication device 30. The access node transmits signals, such as pilot signals or synchronization signals, in the various beams 50-54, which the communication device 30 may receive and detect. From a received signal, or beam, an associated access node beam identity may be detected. The access node beam identity may be determined from a pilot signal or other signal. Alternatively, the access node beam identity may be associated with a resource set allocation of that beam. The communication device 30 is subsequently configured to determine link quality metrics for the received access node beam. The communication device 30 is further configured to transmit a beam report, comprising said access node beam identities and said link quality metrics, to the access node 20.

In NR 5G systems, the access node, denoted the gNB, can be expected to include one or more transmission/reception points (TRPs). The gNB may use different CSI-RS resource sets for different TRPs. This means that the UE, i.e. the communication device 30, knows that it is different TRPs. If the UE only reports beams from a single set as of today, it is open how to report beams from multiple resource sets. According to various embodiments, it is proposed that the device beam 34, 36 associated with a reported access node beam 50, 51 identifies a TRP beam. This is preferably communicated so that the access node 20 does not schedule access node beams 50, 51 from different TRPs to the same device beam 34, 36, or a different communication device 40 in an access node beam 50, 51 that will cause interference to the communication device 30.

Referring again to FIG. 1, the two, or more, antennas 32, 33 of the communication device 30 form an antenna arrangement, whereby the logic 31 of the communication device 30 is coupled to the antenna arrangement and configured to receive one or more identifiable radio signals from the wireless network 1 in the different device beams. Once an access node 20 concludes a beam sweep, the communication device 30 may have collected signal strengths across all or at least a plurality of detected access node tx beams, and some or all of its own rx device beams. In such a scenario, connection and communication between the access node 20 and the communication device 30 may be executed in so-called beam pairs. With reference to FIG. 1 or 2, such a beam pair could e.g. be beams 50, 34. The logic 31 of the communication device 30 is configured to determine a link quality metric for one or more device beams based on the received radio signals. In a scenario where MIMO transmission is used or declared by the wireless network, the communication device 30 may be configured to report a few (configurable in specification) preferred beams pairs. A problem targeted herein is that as seen from the access node 20, the reported beam indices are just numbers, with no proper physical meaning with regard to the device beams.

This disclosure is associated with the notion of including information in the beam report, indicating whether or not the link quality metrics correspond to, or are associated with, different device beams 34, 36. This may be achieved in numerous ways, and various exemplary and non-exhaustive embodiments will be presented herein.

In the exemplary embodiments of FIGS. 4 to 8, the content or format of a beam report are disclosed. The beam report 401 may include a candidate list, including a determined link quality metric 43 for some or each access node beam 50, 51, 52 received from the access node 20. An access node beam identity 41 is determined by the communication device 30 based on the received beams, such as a pilot signal or synchronization signal transmitted by the access node 20. In the drawings, the access node beam identity 41 is indicated as BS beam. In the examples, the access node beam identity 41 of beam 50 is 2, the access node beam identity 41 of beam 51 is 6, and the access node beam identity 41 of beam 52 is 7. In the shown exemplary embodiments, the beam report 401 also includes information indicating whether the link quality metrics 43 for the received access node beams are associated with different device beams 34, 36, which information may be provided in different forms. This provides the effect that the access node 20 may determine whether or not the communication device 30 is suitably connectable for MIMO communication.

In various of the described embodiments, the beam report 401 comprises information which identifies link quality metric 43 for a pair of one device beam 34, 36 and one access node beam 50, 51, 52. This way, the access node 20 is able to receive and decode the beam report 401, and deduce from the beam report 401 whether reported link quality metrics of an access node beam corresponds to different device beams. Report of pairs of access node beam and device beam may be carried out with or without specifically identifying a device beam identity 42, and may convey the information whether the link quality metrics 43 for the received access node beams are associated with different device beams 34, 36 in many different ways.

FIG. 4 illustrates an embodiment of a beam report 401, wherein information indicating whether the link quality metrics 43 for the received access node beams are associated with different device beams 34, 36 is provided by including a device beam identity 42. Specifically, a link quality metric 43 is indicated with a corresponding pair of an access node beam identity 41 and a device beam identity 42.

It should be noted here that the numbering system for the device beams 34, 36, presented in FIG. 4 as 1 and 2, may be totally arbitrary. The importance lies rather in the capability of the access node beams are heard in different or in the same device beam. In various embodiments, the device beams may be identified by a single bit, where the system 10 or the communication device 30 is configured to operate with at most two beam pairs in MIMO.

FIGS. 5A and 5B illustrate embodiments wherein information identifying the device beam associated with each received access node beam by means of an order of providing the access node identities in the beam report 401. From the point of view of the access node 20, only the access node beam identities 41 are known, whereas the link quality metric 43 and the potential association with device beams is information to extract from the beam report 401. Hence, by providing information in the beam report in an order with respect to the access node beam identity 41, which order may be preconfigured by specification, both the link quality metric 43 and the association with device beam may be conveniently determined in the access node 20.

In the example of FIG. 5A, a device beam identity is also included in the beam report. Again, the numbering system for the device beams 34, 36, presented in FIG. 4 as beam 1 and 2, may be totally arbitrary.

In the example of FIG. 5B, which is an alternative to FIG. 5A, the beam report lists the access node beam identities 41 which have been heard by the communication device 30 in a predetermined order, without specifically providing a device beam identity. Instead, an indication is provided that, by the order of the beam report data, association with different device beams may be concluded by the access node 20. In the example of FIG. 5B, this indication may be provided by including a particular code, flag or value before listing an access node beam identity. This indication may be detected in the beam report, so as to identify that the subsequently listed access node beam identity 41 and its related link quality metric 43, is associated with a different beam device than the previously listed link quality metrics 43.

The embodiments of FIGS. 5A and B provide alternative ways of indicating whether link quality metrics for the access node beams identified in the beam report 401 are associated with different device beams, where less data needs to be included to convey this information. These embodiments are based on the notion that it is only required to indicate for which access node beams the device beam remains the same. Furthermore, with reference to FIG. 5B, it is in fact not necessary to give any number for the device beam, merely to flag that a new one is coming.

FIG. 6 illustrates another embodiment, providing yet way of indicating whether link quality metrics for the access node beams identified in the beam report 401 are associated with different device beams. The beam report comprises access node beam identities 41 and link quality metrics 43. Furthermore, the beam report 401 identifies a device beam only when more than one link quality metric 43 for a common device beam is included the beam report 401. Hence, the communication device 30 does not report any device beam as long as the same device beam has not been used before in the beam report 401. In one embodiment, whenever an access node beam identity is reported that is sharing device beam with an access node beam provided elsewhere in the report 401, a flag may be appended that pinpoints which other access node beam it is sharing device beam with. In one embodiment, a position in the list of the beam report 401 may be pinpointed, rather than the access node beam identity or number itself. This saves indexing bits, since the candidate list of the beam report typically is shorter than the number of possible access node beams, and hence the number of bits required for identifying access node identity 41.

In the specific embodiment of FIG. 6, the access node beams with identity 41 number 2 and 6 are heard in a common device beam, and associated link quality metrics 43 are determined. The beam report may list access node beams and associated link quality metrics in any order, such as in order of access node beam identity 41, as shown in the drawing of FIG. 6, or in order of link quality metric 43 level. This order may be specified or otherwise predetermined, or it may be freely selected by the communication device 30, as long as there is a clear association between access node identity 41 and link quality metrics 43. In the example of the drawing, a first entry is made in the list of the beam report 401, which entry reports link quality metric level 10 for a heard access node beam with identity 2. Furthermore, a second entry in the list of the beam report 401 reports link quality metric level 2 for a heard access node beam with identity 6. Note that in this context, first and second need not indicate the respective place in the list, but simply different entries. Data is furthermore provided which links the first and second entries, to indicate that the link quality metrics for these entries are associated with a common device beam. This data may e.g. be a flag or pointer to a position in the list, from one of the first and second entries, to the other. Specifically, only one pointer is preferably provided, which point one of the entries to the other, in order to save data. In the shown embodiment, a later entry associated with access node beam identity 6 is provided with data, exemplified by *1 pointing to entry number 1, which is associated with access node beam identity 2. In an alternative embodiment, the first entry associated with access node beam identity 2 may instead, or in addition, be provided with data pointing to entry number 2, which is associated with access node beam identity 6.

The beam reports as exemplified by the embodiments outlined with reference to FIG. 4-6 may in various embodiments be executed as extended candidate lists, or beam reports 401. In other words, a beam report without information indicating whether link quality metrics for various access node beam heard in the communication device 30 are associated with different device beams, e.g. as indicated in FIG. 3, may be transmitted from the communication device 30 unless triggered to determine and transmit an extended beam report including such information. The extended beam report 401 may be triggered in case one of the parties, i.e. the access node 20 or the communication device 30, sees a need for MIMO transmission. Both the access node 20 and the communication device 30 are preferably configured to be able to trigger the extended beam report 401, and to send a signal to the other party to that effect. The access node 20 may trigger the extended list in case it observes that two or more of its beams are strong. It then needs to screen the possibility to enter MIMO mode, and triggers the extended list. The communication device 30, on the other hand, may observe that two access node beams 50, 51 are reachable from different device beams 34, 36, and therefore triggers the extended reporting to inform the access node 20 about this.

With reference to FIGS. 7A to 7C, further embodiments of the method for conveying a beam report 401 are shown. In certain cases, it may be of interest for the access node 20 to screen the interference situation, i.e., how much of reported access node beams can be heard in both or each of a plurality of communication device beams.

FIG. 7A indicates a beam report similar to that of FIG. 4, where the indication of the weaker access node beam 6 is left out. This may represent an embodiment wherein the information indicating that the first 50 and second 51 access node beams were received in different device beams 34, 36, is conveyed by including a link quality metric associated with both beams. This may be employed in an embodiment where the access node is configured to expect report of only one (the strongest) access node beam, as received in one currently active device beam. The fact that two access node beams 2, 7 are reported, will thus inform the access node 20 that these were in fact received in different device beams 34, 36. Specifically, in such an embodiment, the identification of device beam 42 may be left out in the beam report 401. The beam report 401 includes link quality metrics 43 provided for access node beams 2 and 7, together with an indication that they were heard in different device beams 1 and 2, respectively. In the report 401 of FIG. 7A, there is no data indicating how well the reported access node beams can be heard in both or each of a plurality of communication device beams 1 and 2. Since the communication device 30 did not report these values, they can be suspected to be low by the access node 20. However, as the candidate list of the beam report 401 may be selected by the communication device 30 alone by a transparent, to the standard, algorithm, this cannot be taken for granted. So, if the access node 20 may have use for the entire interference situation, e.g. due to high traffic load from multiple communication devices, may access node 20 may trigger an interference report. In one embodiment, also the communication device 30 can also trigger such an interference report.

FIG. 7B schematically illustrates such an interference report 701, which may be seen as a special version of a beam report 401. Upon detecting a trigger event for such an interference report 701, the access node 30 may be configured to determine interference data and/or transmit an interference report responsive to said trigger event, such as an access node 20 request. The communication device 30 may thereby be configured to determine interference data, including link quality metrics 43 for the access node beams included in a beam report 401, or as specified by the access node 20, for all device beams in which any of said access node beams are heard.

With reference to the example of FIG. 7A, a first access node beam 50, with access node beam identity 2, has been detected in a device beam 34, potentially having a device beam identity 1, with an associated link quality metric 10. Furthermore, a second access node beam 51, with access node beam identity 7, has been detected in another device beam 36, potentially having a device beam identity 2, with an associated link quality metric 9. Responsive to the trigger event for an interference report 701, quality link metrics 43 for both detected, or previously reported, access node beams 50, 51, with identities 2, 7, are determined and provided for both the first and second receive chain rx device beams 1, 2 in the interference report 701.

FIG. 7C illustrates a variant of the interference report of FIG. 7B. Herein, indexing of the device beams, or specific identification of device beam identities 42, is omitted. Instead, the configuration of the interference report may be predetermined, e.g. by agreement, or by instruction from the access node 20, or by specification. As an example, indicated in FIG. 7C, link quality metrics are reported in pairs for each identified access node beam 41, such that each entry pair in the interference list 701 is associated with the same set of device beams. Needless to say, if more than two entries are included for an identified access node identity 41, than each of those entries the interference list 701 is associated with the same set of more than two device beams.

FIG. 8 illustrates an embodiment, wherein an even more precise interference report 801 can be requested. In this embodiment, the link quality metric 83 may be provided as exact channel values, rather than e.g. gains. This allows the access node 20 to make an even more sophisticated decision about transmission schemes. The communication device 30 may be configured to provide channel values as link quality metrics 83 in response to a triggering event, such as a request from the access node 20. This triggering event may be detected while transmitting beam reports as outlined with reference to FIGS. 4-7A, or while transmitting beam reports as outlined with reference to FIG. 7B. Furthermore, it should be noted that the interference report with channel values 83 may omit indexing or identification of device beam identity 42, and rather take the shape of the interference report of FIG. 7B, where the order in the report identifies different device beams in which the access node beams are heard.

Figure 9:
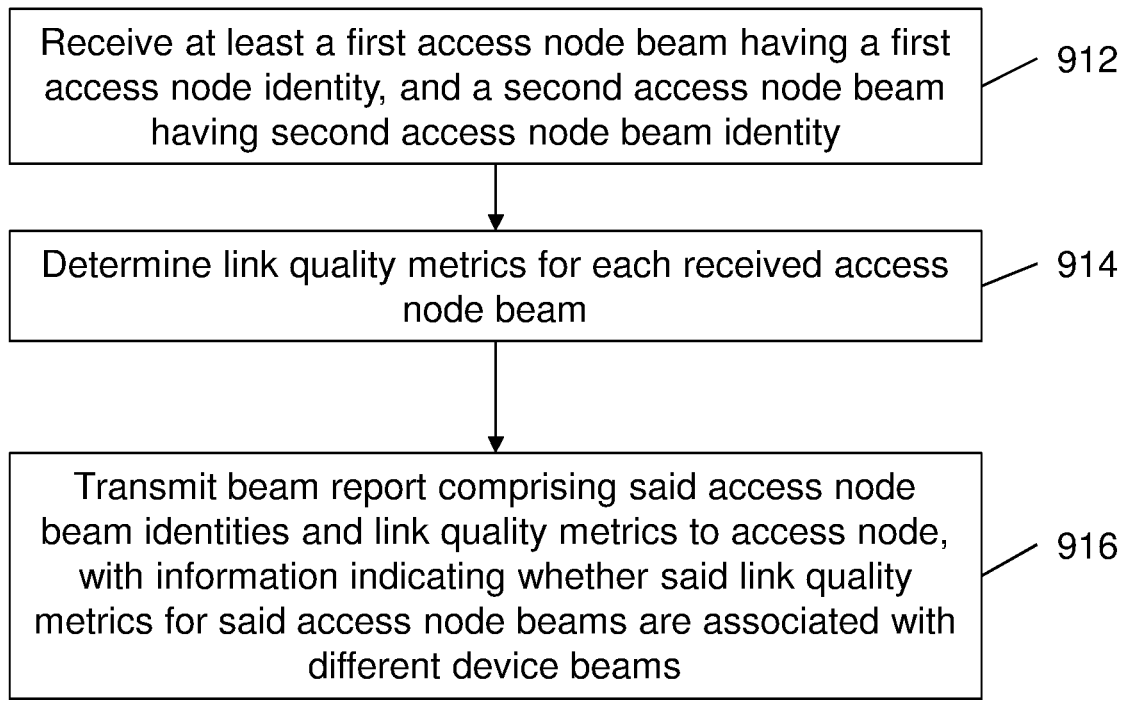
FIG. 9 illustrates a flow chart for a communication device according to various embodiments.
Figure 10:
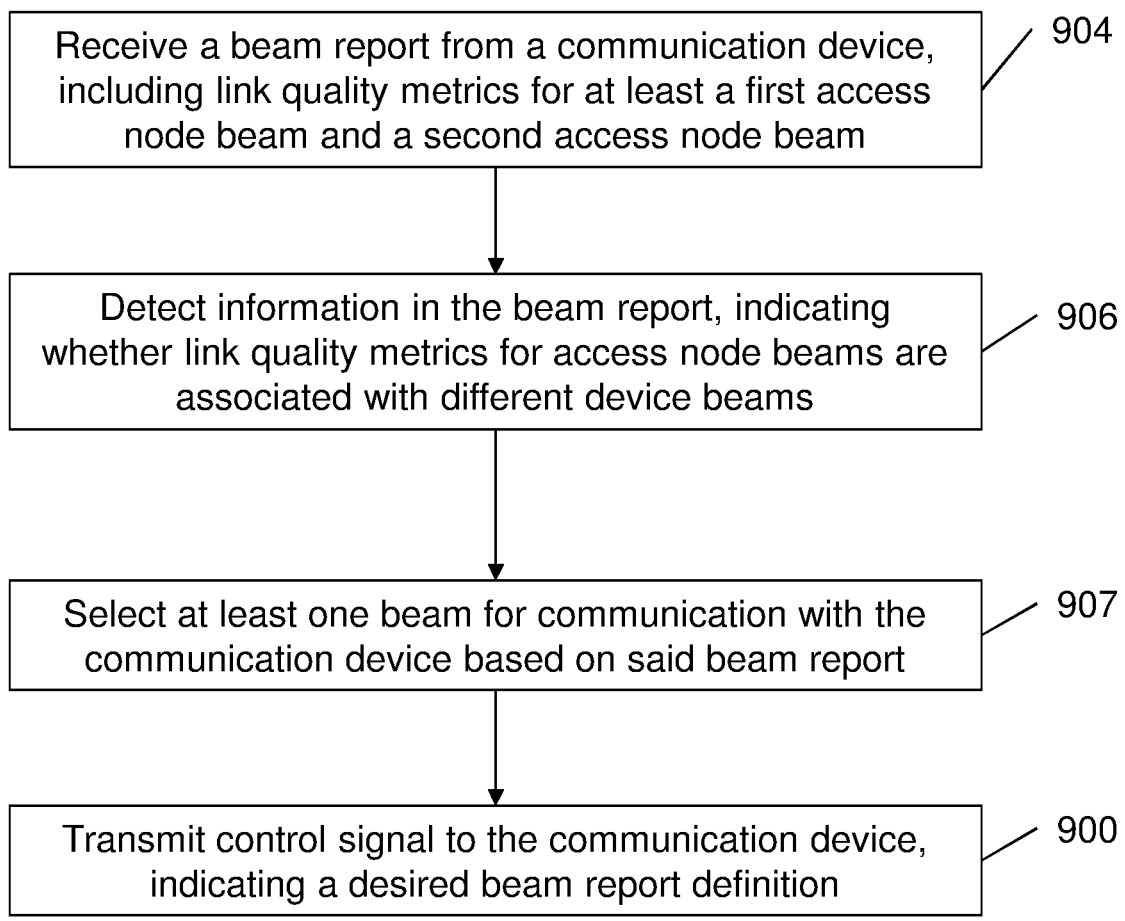
FIG. 10 illustrates a flow chart for an access node according to various embodiments.
Figure 11:
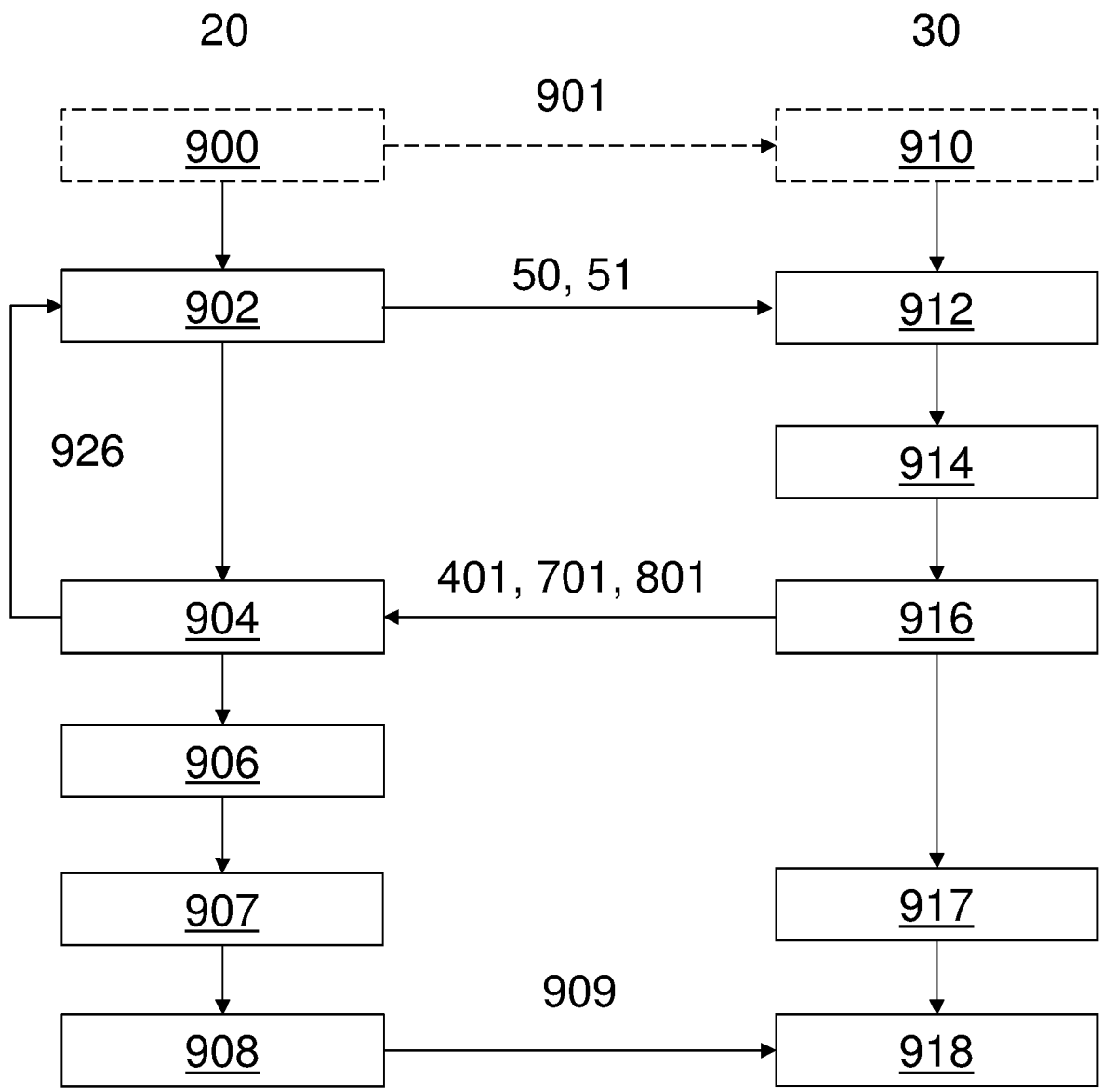
FIG. 11 illustrates a flow chart for a wireless communication system, including steps and signals in communication between a communication device and an access node according to various embodiments.

FIGS. 9 to 11 illustrate method steps of embodiments outlined herein.

FIG. 9 discloses steps carried out in a communication device 30 configured to communicate with an access node 20 of a wireless network 1, wherein the communication device is capable of communicating via at least two different device beams 34, 36. The communication device may comprise an antenna arrangement 32,33 configured for beamforming, and a logic 31 coupled to the antenna arrangement.

FIG. 10 discloses steps carried out in an access node 20 of a wireless network 1, for transmission of radio signals in a plurality of access node beams 50, 51 of a beam sweep. The access node may comprise an antenna arrangement 22 configured for beamforming, and a logic 21 coupled to the antenna arrangement.

FIG. 11 illustrates the steps outlined in FIGS. 9 and 10 in a common flowchart, including steeps carried out both by the communication device 30 and the access node 20, as well as signals transmitted between them. By step 926 in FIG. 10, it is indicated that beam reporting may be suitably repeated, whereas beam selection and allocation need not be carried out for every beam report.

With reference to FIGS. 9 and 11, various embodiments may relate to a method in a communication device 30 for providing a beam report 401 to an access node 20 of a wireless network, wherein the communication device is capable of communicating via at least two different device beams 34, 36. The method may comprise
  receiving 912, from the access node 20, at least a first access node beam 50 having a first access node identity, and a second access node beam 51 having a second access node beam identity. The method may further comprise
  determining 914 link quality metrics for each received access node beam; and
  transmitting 916 the beam report 401, comprising said access node beam identities and said link quality metrics, to the access node. The beam report may specifically include information indicating whether said link quality metrics for the first access node beam 50 and a second access node beam 51 are associated with different device beams.

The method may further comprise
  detecting 910 a trigger event 901 for an extended beam report; and
  providing said information in the beam report 401 responsive to said trigger event for an extended beam report. Such a trigger event can involve receiving a signal 901 from the access node.

The method may further comprise
  determining 914 interference data, including link quality metrics for the first and second access node beam, each associated with at least two different device beams;
  transmitting an interference report 701 to the access node, including said interference data.

The method may further comprise
  detecting 910 a trigger event 901 for an interference report;
  wherein determining interference data and/or transmitting the interference report 701 is carried out responsive to said trigger event for an interference report.

The method may further include receiving 918 a control signal 909 from the access node 20, indicating selection of at least one beam pair with one of said access node beams 50, 51 and one device beam 34, 36.

With reference to FIGS. 10 and 11, various embodiments may relate to a method in an access node 20 of a wireless network, for transmission 902 of radio signals in a plurality of access node beams 50, 51 of a beam sweep. The method may comprise
  receiving 904 a beam report 401 from a communication device 30, including link quality metrics for at least a first access node beam 50 and a second access node beam 51. The method may further comprise
  detecting 906 information in the beam report, indicating whether said link quality metrics for the first access node beam 50 and a second access node beam 51 are associated with different device beams in the communication device. The method may comprise
  selecting 907 at least one beam for communication with the communication device based on at least said beam report.

The method may further include transmitting 908 a control signal 909, indicating selection of at least one beam pair with one of said access node beams 50, 51 and one device beam 34, 36, to said communication device 30.

The method may further comprise transmitting 900 a control signal 901 to the communication device, indicating a desired beam report definition with regard to association of said link quality metrics to said device beams. Said control signal may include a trigger 901 for an extended beam report, instructing the communication device to provide said information in the beam report 401. Said control signal may alternatively include a trigger 901 for interference data 701, instructing the communication device to include link quality metrics for the first and second access node beam, each associated with at least two different device beams 34, 36.

The proposed solutions provide increased knowledge to the wireless network 1, and specifically the access node 20, for handling communication devices 30 in its cell. Specifically, methods, devices and schemes are suggested for conveniently providing information to the access node 20, so as to improve decision-making associated with beam selection in general, and for MIMO operation in particular.

The invention claimed is:

1. A method in a communication device for providing a beam report to an access node of a wireless network, wherein the communication device is capable of communicating via at least two different device beams, the method comprising:
   receiving, from the access node, at least a first access node beam having a first access node beam identity, and a second access node beam having a second access node beam identity;
   determining link quality metrics for each received access node beam;
   transmitting, to the access node, the beam report, comprising a list of entries, which each include an access node beam identity and the associated determined link quality metric;
   wherein the beam report includes information indicating whether or not said list entries are obtained with different device beams, said information comprising one of:
      an indicator provided to identify that an entry listed subsequent to the indicator in the list is obtained with a different device beam than an entry listed previous to the indicator, or
      an indicator provided in one entry and pointing to another entry in the list, where those entries are obtained with the same device beam.

2. The method of claim 1, wherein said information identifies a link quality metric for a pair of one device beam and one access node beam.

3. The method of claim 1, wherein said information is provided by a device beam identity linked to the respective access node beam identity for each of said first and second access node beam.

4. The method of claim 1, wherein said entries are provided in a predetermined order in the list.

5. The method of claim 1, wherein said information includes data linking said first and second access node beam identities in the beam report, responsive to the link quality metric for the first and second access node beams being associated with a common device beam.

6. The method of claim 1, comprising:
   detecting a trigger event for an extended beam report;
   providing said information in the beam report responsive to said trigger event for an extended beam report.

7. The method of claim 1, comprising:
   determining interference data, including link quality metrics for the first and second access node beam, each associated with at least two different device beams;
   transmitting an interference report to the access node, including said interference data.

8. The method of claim 7, comprising:
   detecting a trigger event for an interference report;
   wherein determining interference data and/or transmitting the interference report is carried out responsive to said trigger event for an interference report.

9. The method of claim 1, wherein the beam report includes link quality metrics for both the first access node beam and a second access node beam only if they are associated with different device beams.

10. A method in an access node of a wireless network, for transmission of radio signals in a plurality of access node beams of a beam sweep, comprising:
    receiving a beam report from a communication device, said beam report comprising a list of entries, which each include an access node beam identity and an associated determined link quality metric obtained by the communication device;
    detecting information in the beam report, indicating whether or not said list entries were obtained with different device beams in the communication device, said information comprising one of:
       an indicator provided to identify that an entry listed subsequent to the indicator in the list is obtained with a different device beam than an entry listed previous to the indicator, or
       an indicator provided in one entry and pointing to another entry in the list, where those entries are obtained with the same device beam;
    selecting at least one beam for communication with the communication device based on at least said beam report.

11. The method of claim 10, comprising:
    transmitting a control signal to the communication device, indicating a desired beam report definition with regard to association of said link quality metrics to said device beams.

12. The method of claim 11, wherein said control signal includes a trigger for an extended beam report, instructing the communication device to provide said information in the beam report.

13. The method of claim 11, wherein said control signal includes a trigger for interference data, instructing the communication device to include link quality metrics for the first and second access node beam, each associated with at least two different device beams.

14. The method of claim 10, wherein said quality link metric is a channel value determined in the communication device.

15. A communication device configured to communicate with an access node of a wireless network via a plurality of different device beams, comprising:
    an antenna arrangement configured for receiving radio signals transmitted in a plurality of beams from an access node, and for transmitting radio signals; and
    a logic coupled to the antenna arrangement and configured to:

receive, from the access node, at least a first access node beam having a first access node beam identity, and a second access node beam having a second access node beam identity;

determine link quality metrics for each received access node beam;

transmit, to the access node, the beam report, comprising a list of entries, which each include an access node beam identity and the associated determined link quality metric;

wherein the beam report includes information indicating whether or not said list entries are obtained with different device beams, said information comprising an indicator provided in one entry and pointing to another entry in the list, where those entries are obtained with the same device beam.

16. The communication device of claim 15, wherein said information is provided by a device beam identity linked to the respective access node beam identity for each of said first and second access node beam.

17. The communication device of claim 15, wherein the logic is configured to:

determine interference data, including link quality metrics for the first and second access node beam, each associated with at least two different device beams;

transmit an interference report to the access node, including said interference data.

18. The communication device of claim 15, wherein the beam report includes link quality metrics for both the first access node beam and a second access node beam only if they are associated with different device beams.

* * * * *